United States Patent
Fujiwara et al.

(10) Patent No.: US 6,646,036 B2
(45) Date of Patent: Nov. 11, 2003

(54) BLOCK COPOLYMER COMPOSITION

(75) Inventors: Masahiro Fujiwara, Oita (JP); Keiichi Toda, Oita (JP)

(73) Assignee: Japan Elastomer Co., Ltd., Tokyo (JP)

( * ) Notice: Subject to any disclaimer, the term of this patent is extended or adjusted under 35 U.S.C. 154(b) by 80 days.

(21) Appl. No.: 09/958,232

(22) PCT Filed: Feb. 22, 2001

(86) PCT No.: PCT/JP01/01317

§ 371 (c)(1),
(2), (4) Date: Jan. 9, 2002

(87) PCT Pub. No.: WO01/62849

PCT Pub. Date: Aug. 30, 2001

(65) Prior Publication Data

US 2002/0193483 A1 Dec. 19, 2002

(30) Foreign Application Priority Data

Feb. 25, 2000 (JP) ........................................ 2000-049174

(51) Int. Cl.⁷ ................................................ C08K 5/36
(52) U.S. Cl. ........................ 524/331; 524/343; 524/348; 524/349; 524/350; 524/351; 524/352; 524/353
(58) Field of Search ................................. 524/331, 343, 524/348, 349, 350, 351, 352, 353

(56) References Cited

U.S. PATENT DOCUMENTS 4,759,862 A * 7/1988 Meier et al. .................. 252/47

FOREIGN PATENT DOCUMENTS

| JP | 4-246454 | 9/1992 |
| JP | 6-279650 | 10/1994 |
| JP | 2000-103906 | 4/2000 |

* cited by examiner

*Primary Examiner*—Peter Szekely
(74) *Attorney, Agent, or Firm*—Birch, Stewart, Kolasch & Birch, LLP

(57) ABSTRACT

A heat stabilized block copolymer composition which comprises a block copolymer comprising a polymer block mainly composed of a monoalkenyl aromatic compound and a polymer block mainly composed of a conjugated diene compound, the content of the monoalkenyl aromatic compound being 5–95% by weight based on the total weight of the block copolymer, and phenolic stabilizers. By adding two or more specific phenolic stabilizers to a block copolymer of a monoalkenyl aromatic compound and a conjugated diene compound, there can be obtained a block copolymer composition which exhibits excellent heat stability even under being heated at high temperatures, is high in the effect of being inhibited from formation of gel-like materials and is excellent in color tone.

4 Claims, No Drawings

BLOCK COPOLYMER COMPOSITION

This application is the national phase under 35 U.S.C. §371 of PCT International Application No. PCT/JP01/01317 which has an International filing date of Feb. 22, 2001, which designated the United States of America and was not published in English.

TECHNICAL FIELD

The present invention relates to a block copolymer composition excellent in heat stability and color fastness which comprises a block copolymer comprising a specific monoalkenyl aromatic compound and a specific conjugated diene compound and a specific phenolic stabilizer.

BACKGROUND ART

Block copolymers comprising monoalkenyl aromatic compounds and conjugated diene compounds which have not been vulcanized have the similar elasticity to that of vulcanized natural rubbers or synthetic rubbers at room temperature if content of the monoalkenyl aromatic compounds is relatively small and, besides, have the similar processability to that of thermoplastic resins at high temperatures, and, hence, they are widely utilized in the fields of footwear, plastics modification, asphalt, pressure sensitive adhesives, and others.

Furthermore, if content of the monoalkenyl aromatic compounds is relatively large, transparent thermoplastic resins excellent in shock resistance are obtained. Therefore, recently, the block copolymers increase in their usage mainly in the fields of food packaging containers and, moreover, their uses are being diversified into a wide variety of fields.

However, since the block copolymers comprising monoalkenyl aromatic compounds and conjugated diene compounds have carbon—carbon double bonds in the molecules, they suffer from the problems that they are inferior in heat stability and the effects to improve characteristics of the block copolymers per se, for example, elastic characteristics, adhesion and impact resistance cannot be sufficiently exhibited. Accordingly, in order to improve the heat stability of these block copolymers, there have been used phenolic stabilizers, phosphorus stabilizers, sulfur stabilizers, and the like.

For example, BHT (2,6-di-tert-butyl-4-methylphenol) which is most widely used must be used in a large amount because it has a relatively high oxidation inhibition function and a relatively high heat resistance, but is readily volatilized in case the molding temperature is high. Furthermore, when other phenolic stabilizers are used, they must be used in a large amount for obtaining high heat stabilization effect, and, thus, in many cases, there is caused a problem that block copolymer compositions are colored in use at high temperatures or at the time of molding at high temperatures. On the other hand, when phosphorus stabilizers and/or sulfur stabilizers are used in combination with phenolic stabilizers, the heat stabilization effect is improved, but there are problems of hydrolysis in the case of phosphorus stabilizers and odor development in the case of sulfur stabilizers.

In view of the above problems, the applicant proposed in JP-A-4-246454 a technique of improving the heat stability of block copolymers by using, in combination, 0.005–0.05 part by weight of a specific sulfur phenolic stabilizer, 0.1–2.0 parts by weight of other specific phenolic stabilizer, and optionally a phosphorus stabilizer. However, it has been found that even this technique requires use of phosphorus stabilizers in actual use. However, since phosphorus stabilizers have the problem of hydrolysis, there is a limit in heat stabilization effect in actual use, and the technique for improving heat stability of block copolymers without using phosphorus stabilizers is demanded.

As mentioned above, conventional stabilizers, whether they are used singly or in combination of two or more, have a limit in the effect to improve heat stability of block copolymers of monoalkenyl aromatic compounds and conjugated diene compounds, and, for some uses, products having sufficient heat stability cannot be obtained and block copolymer compositions having truly high heat stability performance have long been demanded.

The present invention has been made for meeting the demand, and the object is to solve the problems on heat stability performance in the conventional block copolymer compositions and provide block copolymer compositions which can exhibit excellent heat stability even under being heated at high temperatures, are high in the effect to inhibit production of gel-like materials and excellent in color fastness and have a satisfactory color tone.

DISCLOSURE OF INVENTION

As a result of intensive research conducted by the inventors in an attempt to solve the above problems, it has been found that a block copolymer composition comprising a block copolymer of a specific monoalkenyl aromatic compound and a specific conjugated diene compound and a specific phenolic stabilizer is excellent in heat stability, namely, is not deteriorated in properties even if it is heated at high temperatures, can be inhibited from formation of gel-like materials, is excellent in color fastness and has good color tone. Thus, the present invention has been accomplished.

That is, the present invention relates to a block copolymer composition which comprises (a) a block copolymer comprising a polymer block segment mainly composed of a monoalkenyl aromatic compound and a polymer block segment mainly composed of a conjugated diene compound, content of the monoalkenyl aromatic compound being 5–95% by weight based on the total weight of the copolymer, (b) a phenolic stabilizer represented by the following formula (I):

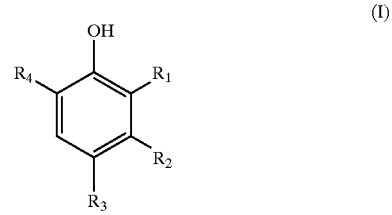

(I)

(wherein $R_1$ and $R_3$ are —$CH_2$—S—$R_5$ in which $R_5$ represents an alkyl group of 1–18 carbon atoms, $R_2$ represents a hydrogen atom or a methyl group, and $R_4$ represents an alkyl group of 1–8 carbon atoms or a cycloalkyl group of 5–12 carbon atoms), and (c) at least one phenolic stabilizer selected from the phenolic compounds represented by the following formulas (II)–(V):

(II)

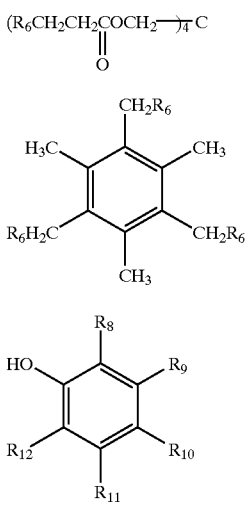

(III)

(IV)

(V)

(wherein $R_6$ is represented by the following formula (VI):

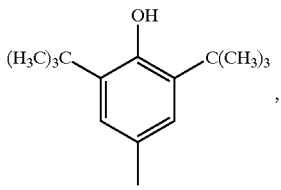

(VI)

$R_7$ represents an alkyl group of 2–22 carbon atoms, and $R_8$–$R_{12}$ each represent a hydrogen atom or an alkyl group of 1–6 carbon atoms, with a proviso that two or more of $R_8$–$R_{12}$ are alkyl groups), content of the phenolic stabilizer (b) being more than 0.05 part by weight and less than 0.6 part by weight and that of the phenolic stabilizer (c) being not less than 0.05 part by weight and not more than 0.8 part by weight based on 100 parts by weight of the block copolymer (a).

BEST MODE FOR CARRYING OUT THE INVENTION

The present invention will be explained in detail below.

The block copolymer used in the present invention is a block copolymer comprising a polymer block segment mainly composed of a monoalkenyl aromatic compound and a polymer block segment mainly composed of a conjugated diene compound. Furthermore, in the block copolymer of the present invention, content of the monoalkenyl aromatic compound is in the range of 5–95% by weight based on the total weight of the block copolymer. In the present invention, said block copolymer may be used singly or in admixture of two or more.

Here, the polymer block segment which is mainly composed of a monoalkenyl aromatic compound and constitutes the block copolymer of the present invention is a homopolymer of the monoalkenyl aromatic compound or a copolymer of the monoalkenyl aromatic compound and other monomers which contains more than 50% by weight of the monoalkenyl aromatic compound and is substantially mainly composed of the monoalkenyl aromatic compound.

The polymer block segment mainly composed of a conjugated diene compound is a homopolymer of the conjugated diene compound or a copolymer comprising a monoalkenyl aromatic compound and the conjugated diene compound and containing more than 50% by weight of the conjugated diene compound. In such copolymer block, the monoalkenyl aromatic compound may be distributed uniformly or ununiformly (for example, with a taper). Furthermore, in the block, there may coexist a plurality of the portions where the monoalkenyl aromatic compound is distributed uniformly and/or the portions where the monoalkenyl aromatic compound is distributed ununiformly.

In the block copolymer of the present invention, the content of the monoalkenyl aromatic compound must be in the range of 5–95% by weight based on the total weight of the block copolymer. If the content of the monoalkenyl aromatic compound is less than 5% by weight, the block copolymer is inferior in mechanical properties such as tensile strength which are preferable characteristics as thermoplastic elastic materials. On the other hand, if it exceeds 95% by weight, the block copolymer is inferior in mechanical strengths such as impact resistance which are preferable characteristics as thermoplastic resins. The block copolymer of the present invention shows the characteristics as thermoplastic resins when the content of the monoalkenyl aromatic compound exceeds 60% by weight, preferably is not less than 65% by weight based on the total weight of the block copolymer, and shows the characteristics as thermoplastic elastic materials when the content of the monoalkenyl aromatic compound is not more than 60% by weight, preferably not more than 55% by weight.

Especially, in the present invention, when the content of the monoalkenyl aromatic compound is not more than 60% by weight based on the total weight of the copolymer, there is obtained a copolymer (thermoplastic elastic material) which is particularly high in the effect of improvement in heat stability, is inhibited from formation of gel-like materials under heating at high temperatures and is excellent in color fastness.

As examples of the monoalkenyl aromatic compound in the block copolymer constituting the present invention, mention may be made of monomers such as styrene, p-methylstyrene, tertiary butylstyrene, α-methylstyrene, 1,1-diphenylethylene, and the like. Among them, styrene is preferred. These monomers may be used each alone or in combination of two or more.

As examples of the conjugated diene compound, mention may be made of monomers such as 1,3-butadiene, isoprene, 2,3-dimethyl-1,3-butadiene, 3-butyl-1,3-octadiene, phenyl-1,3-butadiene, and the like. Among them, 1,3-butadiene and isoprene are preferred. These monomers may be used each alone or in combination of two or more.

The block copolymers used in the present invention are obtained by the generally employed consecutive polymerization method or the consecutive polymerization method in combination with coupling reaction. Structures of the copolymers can be various structures such as straight chain structure, radial structure, star structure, branched structure, and the like.

Typical examples are block copolymers represented by the formula: $(A-B)_n$, $(A-B)_nA$ or $(B-A)_nB$ (wherein A is a polymer block segment mainly composed of monoalkenyl aromatic compound, B is a polymer block segment mainly composed of conjugated diene compound, and n is an integer of 1 or more).

Further examples are block copolymers represented by the formula: $[(A-B)_n]_m$-X, $[(A-B)_nA]_m$-X or $[(B-A)_nB]_m$-X (wherein A is a polymer block segment mainly composed of monoalkenyl aromatic compound, B is a polymer block segment mainly composed of conjugated diene compound, n is an integer of 1 or more, m is an integer of 3 or more, and X represents a residue of trifunctional or higher functional coupling agents or a residue of trifunctional or higher polyfunctional organolithium compounds). Examples of the trifunctional or higher functional coupling agents are silicon tetrachloride, tin tetrachloride, epoxy compounds such as epoxidized soybean oil, and the like, alkoxysilane compounds such as trimethoxysilane, tetramethoxysilane, and the like, polyhalogenated hydrocarbon compounds, carboxy acid ester compounds, and the like.

Number average molecular weight, in terms of polystyrene, of the block copolymers used in the present invention is preferably 20,000–800,000, more preferably 30,000–700,000. If the number average molecular weight is less than 20,000, the mechanical property shown by tensile strength or the like is deteriorated. If the number average molecular weight is more than 800,000, viscosity is too high, and the block copolymer causes unsatisfactory dispersion and deterioration of processability in case they are employed for the uses such as footwear and pressure sensitive adhesives.

Method for producing the block copolymer constituting the present invention will be explained. First, in the case of obtaining, for example, a block copolymer having the A-B-A structure shown by polystyrene-polybutadiene-polystyrene, styrene is polymerized, then butadiene is polymerized and further styrene is polymerized in an inert hydrocarbon solvent using an organolithium compound as a polymerization initiator in an inert gas atmosphere such as nitrogen. When B in the A-B-A structure is a random copolymer block segment of styrene/butadiene, there may also be employed a method which comprises polymerizing styrene and then charging styrene and butadiene together, followed by polymerizing them, a method which comprises simultaneously polymerizing styrene and a part of butadiene and then adding supplemental butadiene, and the like.

The inert hydrocarbon solvents used for the production of the block copolymers of the present invention include, for example, cyclohexane, n-hexane, benzene, toluene, octane and mixtures thereof.

Furthermore, the organolithium compounds used for the production of the block copolymers include, for example, ethyllithium, propyllithium, n-butyllithium, sec-butyllithium, tert-butyllithium, phenyllithium, propenyllithium, and hexyllithium, and the like which are known compounds. Among them, n-butyllithium and sec-butyllithium are preferred. The organolithium compounds may be used each alone or in admixture of two or more. Amount of the organolithium compounds is selected so that the block copolymers have a number average molecular weight in terms of standard polystyrene of 20,000–800,000.

When the segment B of the block copolymer represented by A-B-A structure is a random copolymer of a monoalkenyl aromatic compound and a conjugated diene compound, the chain distribution of the monoalkenyl aromatic compound can be adjusted by adding a polar compound before initiation of the polymerization and/or during the polymerization reaction. As the polar compound, there are used, for example, ethers and tertiary amines, specifically, one or two or more compounds selected from ethylene glycol dimethyl ether, tetrahydrofuran, α-methoxytetrahydrofuran, N,N,N', N'-tetramethylethylenediamine, and the like. Moreover, tertiary alkoxides of alkali metals can also be used. Examples of the tertiary alkoxides of alkali metals are potassium-t-butoxide, potassium-t-amylalkoxides, sodium-amylalkoxides, potassium isopentyloxide, and the like.

Amount of vinyl linkage in the conjugated diene compound in the block copolymer constituting the present invention can also be optionally controlled depending on uses, but is preferably not more than 80 mol %. If the amount of vinyl linkage exceeds 80 mol %, elastic properties or low-temperature characteristics of the block copolymer are sometimes inferior. More preferred amount of the vinyl linkage is not more than 70 mol %. For the control of the amount of vinyl linkage in the conjugated diene compound, there are used, for example, ethers and tertiary amines, specifically, one or two or more selected from ethylene glycol dimethyl ether, tetrahydrofuran, α-methoxytetrahydrofuran, N,N,N',N'-tetramethylethylenediamine, and the like.

The phenolic stabilizer (b) used in the block copolymer composition of the present invention is represented by the formula (I) where substituents $R_1$ and $R_1$ are shown by —$CH_2$—S—$R_5$ is an alkyl group of 1–18 carbon atoms, $R_2$ is a hydrogen atom or a methyl group, and $R_4$ is an alkyl group of 1–8 carbon atoms or a cycloalkyl group of 5–12 carbon atoms. When the substituent $R_4$ is other than methyl group, the substituent $R_2$ is preferably a methyl group.

$R_5$ is preferably an n-octyl group or an n-dodecyl group, and examples of the alkyl group of 1–8 carbon atoms in the substituent $R_4$ are methyl group, ethyl group, n-butyl group, sec-butyl group and tert-butyl group, preferably methyl group and tert-butyl group. Examples of the cycloalkyl group of 5–12 carbon atoms are cyclopentyl group, cyclohexyl group, cycloheptyl group, cyclooctyl group, and the like, preferably cyclohexyl group.

The phenolic stabilizer (b) represented by the formula (I) must be added in an amount of more than 0.05 part by weight based on 100 parts by weight of the block copolymer (a). If the amount of the phenolic stabilizer (b) is not more than 0.05 part by weight, sometimes the phenolic stabilizer (c) other than the phenolic stabilizer (b) must be used in a large amount for obtaining, for example, the effect to inhibit gelation in heating at high temperatures as in the present invention, and in this case the color fastness of the block copolymer composition in heating at high temperatures sometimes deteriorates. Furthermore, if the amount of the phenolic stabilizer (b) is 0.6 part by weight or more, the block copolymer composition may be colored when it is heated at high temperatures for a long time, and, hence, the upper limit is less than 0.6 part by weight, and preferably not more than 0.3 part by weight.

Examples of the phenolic stabilizers represented by the formula (I) are 2,4-bis(n-octylthiomethyl)-6-methylphenol, 2,4-bis(n-dodecylthiomethyl)-6-methylphenol, 2,4-bis(phenylthiomethyl)-3-methyl-6-tert-butylphenol, and the like, and 2,4-bis(n-octylthiomethyl)-6-methylphenol is most preferred.

Furthermore, in the block copolymer composition of the present invention, it is essential that the composition contains at least one phenolic stabilizer (c) selected from phenolic compounds represented by the above formulas (II)–(V). Here, $R_6$ in the formulas (II)–(V) is represented by the following formula (VI):

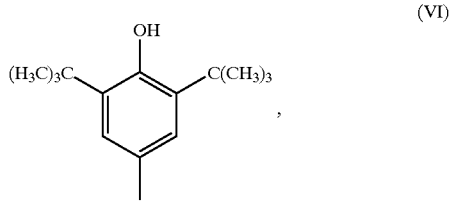

(VI)

$R_7$ is an alkyl group of 2–22 carbon atoms, and $R_8$–$R_{12}$ are a hydrogen atom or an alkyl group of 1–6 carbon atoms, with a proviso that two or more of $R_8$–$R_{12}$ are alkyl groups.

If the amount of the phenolic stabilizer (c) represented by the formulas (II)–(V) is less than 0.05 part by weight, the heat stabilization effect is small, and the effect obtained by using in combination with the phenolic stabilizer (b) represented by the formula (I) is also small. Furthermore, even if it is added in an amount exceeding 0.8 part by weight, there is substantially no effect on the heat stabilization, and rather coloration sometimes occurs. Moreover, addition of the stabilizer in an unnecessary amount is economically disadvantageous. Therefore, the lower limit of the amount of the phenolic stabilizer (c) is 0.05 part by weight, preferably 0.1 part by weight, and the upper limit is 0.8 part by weight, preferably 0.6 part by weight.

Examples of the phenolic stabilizers (c) represented by the formulas (II)–(V) are shown below.

Examples of the compounds represented by the formula (II) are n-octadecyl-3-(3',5'-di-tert-butyl-4'-hydroxyphenyl) propionate and the like.

Examples of the compounds represented by the formula (III) are tetrakis-[methylene-3-(3',5'-di-tert-butyl-4'-hydroxyphenyl) propionate]-methane and the like.

Examples of the compounds represented by the formula (IV) are 1,3,5-trimethyl-2,4,6-tris(3,5-di-tert-butyl-4-hydroxybenzyl)benzene and the like.

Examples of the compounds represented by the formula (V) are 2,6-di-tert-butyl-4-methylphenol, 2,6-di-tert-butyl-4-ethylphenol, and the like.

As especially preferred block copolymer compositions in the present invention, mention may be made of compositions which comprise 100 parts by weight of the above-mentioned block copolymer, 0.055–0.25 part by weight of the phenolic stabilizer (b) represented by the formula (I), and 0.1–0.5 part by weight of the phenolic stabilizer (c) represented by the formulas (II)–(V), and, among them, especially preferred are those which contain in combination the phenolic stabilizer (b) represented by the formula (I) and the phenolic stabilizer (c) represented by the formula (II).

Moreover, most preferably, the blending ratio (b)/(c) of the phenolic stabilizer (b) represented by the formula (I) and the phenolic stabilizer (c) represented by the formulas (II)–(V) is in the range of 0.2–1.5. In the present invention, the total amount of the phenolic stabilizers (b) and (c) is preferably less than 1.4 part by weight, more preferably not more than 1.0 part by weight.

The composition of the present invention comprises essentially the block copolymer (a), the phenolic stabilizer (b) represented by the formula (I) and the phenolic stabilizer (c) represented by the formulas (II)–(V), and, if necessary, a phenolic compound other than (I)–(V) may further be added as a stabilizer. Examples of the phenolic compound other than those of (I)–(V) are 2-tert-butyl-6-(3-tert-butyl-2-hydroxy-5-methylbenzyl)-4-methylphenyl acrylate, 2-[1-(2-hydroxy-3,5-di-tert-pentylphenyl)-ethyl]-4,6-di-tert-pentylphenyl acrylate, and the like, and these are suitably usable for improving heat stability under high shearing. When the phenolic compound other than (I)–(V) are used, the total amount of the phenolic stabilizers (b) and (c) and the phenolic compound other than (I)–(V) is preferably less than 1.4 part by weight, more preferably not more than 1.0 part by weight. Furthermore, the amount of the phenolic compound other than (I)–(V) is preferably 0.05–0.4 part by weight, more preferably 0.1–0.3 part by weight.

It is not necessary that the block copolymer composition of the present invention contains phosphorus stabilizers. The phosphorus stabilizers have hydrolytic properties and show substantially no such a high effect to improve heat stability as in the present invention.

If necessary, the composition of the present invention may contain at least one compound selected from ultraviolet absorbers such as benzotriazole compounds and light stabilizers such as hindered amine compounds.

As examples of the benzotriazole compounds, mention may be made of 2-(2'-hydroxy-5'-methylphenyl) benzotriazole, 2-(2'-hydroxy-5'-tert-octylphenyl) benzotriazole, 2-(2'-hydroxy-3',5'-di-tert-butylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, and the like.

As examples of the hindered amine compounds, mention may be made of bis(2,2,6,6-tetramethyl-4-piperidyl) sebacate, succinic acid dimethyl-1-(2-hydroxyethyl)-4-hydroxy-2,2,6,6-tetramethylpiperidine polycondensate, poly[(6-(1,1,3,3-tetramethylbutyl)imino-1,3,5-triazine-2,4-diyl][2,2,6,6-tetramethyl-4-piperidyl)imino]hexamethylene [[2,2,6,6-tetramethyl-4-piperidyl]imino]], and the like.

The light resistance of the composition of the present invention can be further improved by adding these benzotriazole compounds and hindered amine compounds.

The composition of the present invention can be obtained by polymerizing the monoalkenyl aromatic compound and the conjugated diene compound in accordance with the above-mentioned method, deactivating the resulting solution of the block copolymer (a) with a suitable deactivating agent such as water, alcohol, acid, or the like, adding to the solution the total of a given amount of the phenolic stabilizer (b) represented by the formula (I) and a given amount of the phenolic stabilizer (c) represented by the formulas (II)–(V) or adding directly to the solution before deactivation the total of the phenolic stabilizers (b) and (c) to uniformly disperse the stabilizers, and then removing the solvent by steam stripping, heated roll, or the like.

Alternatively, the composition of the present invention can also be obtained by a method which comprises adding a part of the phenolic stabilizer (b) and a part of the phenolic stabilizer (c) to the above solution of the block copolymer (a), preparing a solid block copolymer composition by the above method, and then adding the remainder of the phenolic stabilizers thereto by a kneading machine such as roll, Banbury mixer, kneader, extruder, or the like.

The method of addition of the stabilizers is not particularly limited, and there may be employed any other methods, and suitable methods can be employed depending on circumstances. The same can be applied to the method of addition of phenolic stabilizers other than the stabilizers (b) and (c), ultraviolet absorbers and light stabilizers.

The block copolymer composition of the present invention can be used as a blend with polystyrene resins such as polystyrene, impact resistant polystyrene and the like, ABS resins, engineering resins and the like, and can also be used as a blend with a polyolefin resin such as polyethylene, polypropylene or the like. Furthermore, the block copolymer composition can be suitably used as a substrate for hot-melt adhesives by adding thereto a tackifier or an oil, and, further, may be blended with straight asphalt, blown asphalt or the like.

As far as the object of the present invention is not damaged, other additives such as softening agent, reinforcing agent, flame-retardant, foaming agent, plasticizer, coloring agent, and the like can be further added to the block copolymer composition of the present invention.

EXAMPLES

The present invention will be explained in more detail by the following examples and comparative examples, which show the excellent effects obtained by the specific construction of the present invention and should not be construed as limiting the scope of the invention in any manner. The various measurements are conducted in accordance with the following methods.

1) Total Styrene Content in the Block Copolymer:

This was calculated from absorption intensity at 262 nm using an ultraviolet spectrophotometer (Hitachi UV200).

2) Number Average Molecular Weight of the Block Copolymer:

The number average molecular weight was obtained from chromatogram of GPC (apparatus: manufactured by Waters Co., Ltd.; column: combination of three columns of ZOR-BAXPSM 1000-S (two columns) and PSM 60-S (one column) manufactured by Du Pont de Nemours, E.I. Co.; solvent: tetrahydrofuran; measuring conditions: temperature 35° C., flow rate 0.7 ml/min, sample concentration 0.1% by weight, introduction amount: 50 $\mu$l). The value of the number average molecular weight is a conversion value from a calibration curve made using a standard polystyrene (manufactured by Waters Co., Ltd.; molecular weight: $1.75 \times 10^6$, $4.1 \times 10^5$, $1.12 \times 10^5$, $3.5 \times 10^4$, $8.5 \times 10^3$).

Reference Example

<Preparation of Block Copolymer>

The block copolymers used in the examples of the present invention were prepared in the following manner.

A stainless steel reaction vessel of 40 L equipped with a jacket and a stirrer was subjected to sufficient replacement with nitrogen, and therein were charged 17,600 g of cyclohexane, 5.3 g of tetrahydrofuran and 480 g of styrene (referred to as "first styrene"), followed by passing warm water through the jacket to set the temperature of the content at about 65° C. Thereafter, a solution of n-butyllithium in cyclohexane (pure component: 2.6 g) was added thereto to initiate polymerization of the first styrene. After lapse of 4 minutes from nearly complete polymerization of the first styrene, 2240 g of butadiene (1,3-butadiene) was added and continuously polymerization of butadiene was carried out. After the butadiene was nearly completely polymerized, 480 g of styrene (referred to as "second styrene") was charged and continuously polymerization was carried out. After completion of the polymerization of the second styrene, water was added in an amount of 3 mols per 1 mol of n-butyllithium used. After the charging of the first styrene, the reaction system was continuously stirred by the stirrer. The resulting block copolymer had a styrene content of 30% by weight and a number average molecular weight of 105,000.

As the stabilizers, the following were used.

AO-1: 2,4-Bis(n-octylthiomethyl)-6-methylphenol

AO-2: n-Octadecyl-3-(3',5'-di-tert-butyl-4'-hydroxyphenyl) propionate

AO-3: Tetrakis-[methylene-3-(3',5'-di-tert-butyl-4'-hydroxyphenyl) propionate]-methane AO-4: 1,3,5-Trimethyl-2,4,6-tris(3,5-di-tert-butyl-4-hydroxybenzyl)benzene AO-5: 2,6-Di-tert-butyl-4-methylphenol AO-6: 2-Tert-butyl-6-(3-tert-butyl-2-hydroxy-5-methylbenzyl)-4-methylphenyl acrylate AO-7: Tris(nonylphenyl) phosphite Examples 1–6 and Comparative Examples 1–5 and 8

Each of the phenolic stabilizers (AO-1)–(AO-6) was added in a given amount to the block copolymer solution shown in Reference Example with the composition shown in Table 1, and the solvent was removed by steam stripping, followed by dehydration and then drying by a heated roll (110° C.) Furthermore, in Comparative Examples 3–5, after the drying, the phosphorus stabilizer (AO-7) was added in a given amount on the heated roll. Thus, samples of the block copolymer compositions of Examples 1–6 and Comparative Examples 1–5 and 8 were prepared.

These samples were subjected to Labo plastmill kneading test, and the resulting gelation peak (torque peak) time is shown in Table 1.

From the results shown in Table 1, it can be seen that the block copolymer compositions containing the specific phenolic stabilizers (b) and (c) of the present invention in combination had markedly excellent gelling inhibition effect. Furthermore, the compositions containing the phosphorus stabilizer could not be sufficiently inhibited from gelation.

Comparative Examples 6, 7 and 9

Each of the phenolic stabilizers (AO-1), (AO-2) and (AO-3) was added in a given amount to the block copolymer solution shown in Reference Example with the composition given in Table 2, and the solvent was removed by steam stripping, followed by dehydration and then drying by a heated roll (110° C.) to obtain block copolymer compositions of Comparative Examples 6, 7 and 9.

Samples of the compositions of Examples 1, 2 and 4, and Comparative Examples 3 and 6–9 were subjected to heating test. A part (5 g) of the sample was charged in a cylindrical glass sample bottle of 30 cc in internal volume, and the top was covered with an aluminum foil. Then, this bottle was left to stand at 180° C. in a Geer oven (model GPHH-100 manufactured by Tabai Espec Co., Ltd.), and change of color with time of the sample after heating was observed and toluene-insoluble matter was measured. The results are shown in Table 2.

From the results, it can be seen that the block copolymer compositions containing the specific phenolic stabilizers (b) and (c) of the present invention in combination were excellent in the balance between the color fastness after heating and the gelling inhibition effect.

TABLE 1

|  | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp. Ex. 5 | Comp. Ex. 8 |
|---|---|---|---|---|---|---|---|---|---|---|---|---|
| Amount of Stabilizer (Note 1) | | | | | | | | | | | | |
| AO-1 | 0.07 | 0.07 | 0.07 | 0.1 | 0.15 | 0.08 | 0 | 0.07 | 0 | 0 | 0 | 0.04 |
| AO-2 | 0.2 | 0 | 0 | 0.25 | 0.3 | 0.2 | 0 | 0 | 0.2 | 0 | 0 | 0.5 |
| AO-3 | 0 | 0.2 | 0 | 0 | 0 | 0 | 0.2 | 0 | 0 | 0 | 0 | 0 |
| AO-4 | 0 | 0 | 0.2 | 0 | 0 | 0 | 0 | 0 | 0 | 0.2 | 0 | 0 |
| AO-5 | 0 | 0 | 0 | 0 | 0 | 0 | 0 | 0 | 0 | 0 | 0.6 | 0 |
| AO-6 | 0 | 0 | 0 | 0 | 0 | 0.2 | 0 | 0 | 0 | 0 | 0 | 0 |
| AO-7 | 0 | 0 | 0 | 0 | 0 | 0 | 0 | 0 | 0.5 | 0.5 | 0.5 | 0 |
| Labo.plastmill kneading test (Note 2) | | | | | | | | | | | | |
| (Condition I) Gelation peak time (minute) | 16 | 13 | 13 | 23 | 30 | 22 | 4 | 11 | 10 | 9 | 13 | 12 |
| (Condition II) Gelation peak time (minute) | 30 | 23 | 24 | 41 | 56 | 49 | 6 | 19 | 17 | 15 | 18 | 18 |

(Note 1)
Amount of the stabilizer (part by weight) is based on 100 parts by weight of the block copolymer.
(Note 2)
Labo.plastmill kneading conditions (kneading machine; 50R150 manufactured by Toyoseiki Co., Ltd.)
1. Condition I
Amount of sample: 50 g, Kneading conditions: After the sample was kneaded under pre-heating at 190° C. for 3 minutes at 10 rpm, the measurement was conducted with increasing the number of revolution to 120 rpm.
2. Condition II
The same method as of Condition 1 was carried out in nitrogen atmosphere.

TABLE 2

|  | Ex. 1 | Ex. 2 | Ex. 4 | Comp. Ex. 3 | Comp. Ex. 6 | Comp. Ex. 7 | Comp. Ex. 8 | Comp. Ex. 9 |
|---|---|---|---|---|---|---|---|---|
| Amount of stabilizer (Note 1) | | | | | | | | |
| AO-1 | 0.07 | 0.07 | 0.1 | 0 | 0.07 | 0.6 | 0.04 | 1.0 |
| AO-2 | 0.2 | 0 | 0.25 | 0.2 | 0 | 0.2 | 0.5 | 0 |
| AO-3 | 0 | 0.2 | 0 | 0 | 1.5 | 0 | 0 | 0 |
| AO-7 | 0 | 0 | 0 | 0.5 | 0 | 0 | 0 | 0 |
| Heating test at 180° C. by Geer oven (Note 3) | | | | | | | | |
| Color after 2 hours | ⊚ | ⊚ | ⊚ | ○ | Δ | ○ | ○ | ○ |
| Color after 5 hours | ○ | ○ | ○ | ○~Δ | X | Δ | ○~Δ | Δ |
| Color after 10 hours | ○~Δ | Δ | Δ | Δ~X | XX | X | Δ~X | X |
| Toluene-insoluble matter after 10 hours (%) | 42 | 51 | 31 | 81 | 18 | 16 | 64 | 20 |

(Note 3)
1. Judgement after heating
⊚: Colorless (white) or substantially no change
○: Light yellow~yellow
Δ: Light brown
X: Brown
XX: Dark brown
2. Toluene-insoluble matter (wt %)
One gram of the composition after heating was dissolved in 100 g of toluene, the solution was filtered through a wire gauze of 100 mesh, and the residue on the wire gauze was dried and calculated as toluene-insoluble matter.

Industrial Applicability

As mentioned above, the block copolymer composition of the present invention shows excellent heat stability even under heating at high temperatures, is high in the effect of being inhibited from formation of gel-like material and is excellent in color fastness. Thus, the block copolymer composition of the present invention can solve the problems on heat stability in conventional block copolymer compositions and becomes possible to sufficiently exhibit the excellent elasticity, adhesion, impact resistance and the like which are possessed by block copolymers comprising monoalkenyl aromatic compounds and conjugated diene compounds. Therefore, the composition can be utilized in various fields of footwear, plastics modification, asphalt, adhesives, food packaging containers, and others.

What is claimed is:

1. A block copolymer composition which comprises (a) a block copolymer comprising a polymer block segment mainly composed of a monoalkenyl aromatic compound and a polymer block segment mainly composed of a conjugated diene compound, the content of the monoalkenyl aromatic compound being 5–95% by weight based on the total weight of the block copolymer, (b) a phenolic stabilizer represented by the following formula (I):

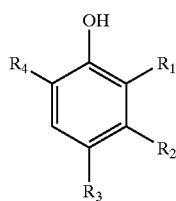

(wherein $R_1$ and $R_3$ are $-CH_2-S-R_5$ in which $R_5$ represents an alkyl group of 1–18 carbon atoms, $R_2$ represents a hydrogen atom or a methyl group, and $R_4$ represents an alkyl group of 1–8 carbon atoms or a cycloalkyl group of 5–12 carbon atoms), and (c) at least one phenolic stabilizer selected from phenolic compounds represented by the following formulas, (II)–(V):

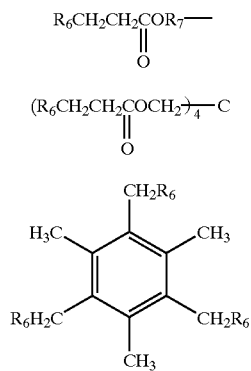

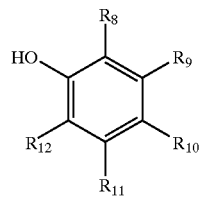

(wherein $R_6$ is represented by the following formula (VI):

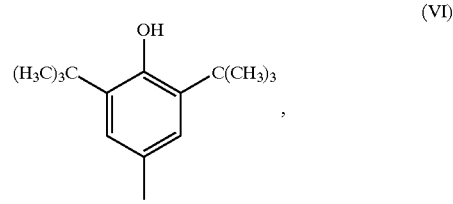

$R_7$ represents an alkyl group of 2–22 carbon atoms, and $R_8$–$R_{12}$ each represent a hydrogen atom or an alkyl group of 1–6 carbon atoms, with a proviso that two or more of $R_8$–$R_{12}$ are alkyl groups), the content of the phenolic stabilizer (b) being more than 0.05 part by weight and less than 0.6 part by weight and that of the phenolic stabilizer (c) being not less than 0.05 part by weight and not more than 0.8 part by weight based on 100 parts by weight of the block copolymer (a).

2. A block copolymer composition according to claim 1, wherein the component (a) is a block copolymer shown by the formula: $(A-B)_n$, $(A-B)_nA$ or $(B-A)_nB$ (wherein A is a polymer block segments mainly composed of monoalkenyl aromatic compound, B is a polymer block segment mainly composed of conjugated diene compound, and n is an integer of 1 or more).

3. A block copolymer composition according to claim 1, wherein the component (a) is a block copolymer shown by the formula: $[(A-B)_n]_m-X$, $[(A-B)_nA]_m-X$ or $[(B-A)_nB]_m-X$ (wherein A is a polymer block segment mainly composed of monoalkenyl aromatic compound, B is a polymer block segment mainly composed of conjugated diene compound, n is an integer of 1 or more, m is an integer of 3 or more, and X represents a residue of a trifunctional or higher functional coupling agent or a residue of a trifunctional or higher polyfunctional organolithium compound).

4. A block copolymer composition according to any one of claims 1–3, wherein the block copolymer (a) has a number average molecular weight of 20,000–800,000, and the content of the monoalkenyl aromatic compound is 5–60% by weight based on the total weight of the block copolymer.

* * * * *